United States Patent
Frindell et al.

(10) Patent No.: US 8,379,865 B2
(45) Date of Patent: Feb. 19, 2013

(54) MULTIKEY SUPPORT FOR MULTIPLE OFFICE SYSTEM

(75) Inventors: Alan H. Frindell, Seattle, WA (US); Dan Hill, Redwood City, CA (US); Venkitachalam Gopalakrishnan, Fremont, CA (US); Abdesalam Laqtib, San Francisco, CA (US); Eric Murray, Los Gatos, CA (US)

(73) Assignee: SafeNet, Inc., Belcamp, MD (US)

( * ) Notice: Subject to any disclaimer, the term of this patent is extended or adjusted under 35 U.S.C. 154(b) by 952 days.

(21) Appl. No.: 11/927,228

(22) Filed: Oct. 29, 2007

(65) Prior Publication Data

US 2008/0130880 A1 Jun. 5, 2008

Related U.S. Application Data

(60) Provisional application No. 60/854,977, filed on Oct. 27, 2006.

(51) Int. Cl.
*H04L 9/08* (2006.01)
(52) U.S. Cl. .......................................... 380/279
(58) Field of Classification Search .................. 380/279
See application file for complete search history.

(56) References Cited

U.S. PATENT DOCUMENTS

| | | |
|---|---|---|
| 4,386,416 A | 5/1983 | Giltner et al. |
| 4,964,164 A | 10/1990 | Fiat |
| 5,142,272 A | 8/1992 | Kondo |
| 5,222,133 A | 6/1993 | Chou et al. |
| 5,463,702 A | 10/1995 | Trueblood |
| 5,557,712 A | 9/1996 | Guay |
| 5,734,744 A | 3/1998 | Wittenstein et al. |
| 5,764,235 A | 6/1998 | Hunt et al. |
| 5,825,917 A | 10/1998 | Suzuki |
| 5,828,832 A | 10/1998 | Holden et al. |
| 5,848,159 A | 12/1998 | Collins et al. |
| 5,923,756 A | 7/1999 | Shambroom |
| 5,963,642 A | 10/1999 | Goldstein |
| 5,999,629 A | 12/1999 | Heer et al. |
| 6,021,198 A | 2/2000 | Anigbogu |
| 6,061,448 A | 5/2000 | Smith et al. |
| 6,073,242 A | 6/2000 | Hardy et al. |

(Continued)

FOREIGN PATENT DOCUMENTS

| | | |
|---|---|---|
| EP | 0 946 018 B1 | 9/1999 |
| WO | WO 01/03398 A3 | 1/2001 |

(Continued)

OTHER PUBLICATIONS

U.S. Appl. No. 10/526,252, Fountain et al., filed Feb. 24, 2005.

(Continued)

*Primary Examiner* — Kambiz Zand
*Assistant Examiner* — Teshome Hailu
(74) *Attorney, Agent, or Firm* — Drinker Biddle & Reath LLP

(57) ABSTRACT

A novel approach is proposed for centralized administration of a multikey for a plurality of clients at a set of remote office/branch offices (ROBOs). A multikey having a set of properties, permissions, and policies is first associated with a secure item present at one or more of the ROBOs. A set of respective instances of the multikey are then generated for the ROBOs having the secure item, and the set of properties, permissions, and policies are associated with each of the respective instances of the multikey automatically. The instances of the multikey are then provided to the set of ROBOs for the encryption or decryption of the secure item present at the ROBOs.

25 Claims, 4 Drawing Sheets

U.S. PATENT DOCUMENTS

| | | | |
|---|---|---|---|
| 6,081,598 A | 6/2000 | Dai | |
| 6,081,900 A | 6/2000 | Subramaniam et al. | |
| 6,094,485 A | 7/2000 | Weinstein et al. | |
| 6,098,093 A | 8/2000 | Bayeh | |
| 6,098,096 A | 8/2000 | Tsirigotis et al. | |
| 6,105,012 A | 8/2000 | Chang et al. | |
| 6,154,542 A | 11/2000 | Crandall | |
| 6,202,157 B1 | 3/2001 | Brownlie et al. | |
| 6,216,212 B1 | 4/2001 | Challenger et al. | |
| 6,233,565 B1 | 5/2001 | Lewis et al. | |
| 6,233,577 B1 | 5/2001 | Ramasubramani et al. | |
| 6,237,033 B1 | 5/2001 | Doeberl et al. | |
| 6,321,201 B1 | 11/2001 | Dahl | |
| 6,396,926 B1 | 5/2002 | Takagi et al. | |
| 6,397,330 B1 | 5/2002 | Elgamal et al. | |
| 6,442,607 B1 | 8/2002 | Korn et al. | |
| 6,473,802 B2 | 10/2002 | Masters | |
| 6,477,646 B1 | 11/2002 | Krishna et al. | |
| 6,502,135 B1 | 12/2002 | Munger et al. | |
| 6,519,365 B2 | 2/2003 | Kondo et al. | |
| 6,553,393 B1 | 4/2003 | Eilbott et al. | |
| 6,578,061 B1 | 6/2003 | Aoki et al. | |
| 6,584,567 B1 | 6/2003 | Bellwood et al. | |
| 6,587,866 B1 | 7/2003 | Modi et al. | |
| 6,598,167 B2 | 7/2003 | Devine et al. | |
| 6,615,276 B1 | 9/2003 | Mastrianni et al. | |
| 6,621,505 B1 | 9/2003 | Beauchamp | |
| 6,640,302 B1 | 10/2003 | Subramaniam et al. | |
| 6,678,733 B1 | 1/2004 | Brown et al. | |
| 6,681,327 B1 | 1/2004 | Jardin | |
| 6,751,677 B1 | 6/2004 | Ilnicki et al. | |
| 6,757,823 B1 | 6/2004 | Rao et al. | |
| 6,763,459 B1 | 7/2004 | Corella | |
| 6,785,810 B1 | 8/2004 | Lirov et al. | |
| 6,834,112 B1* | 12/2004 | Brickell | 380/279 |
| 6,874,089 B2 | 3/2005 | Dick et al. | |
| 6,886,095 B1 | 4/2005 | Hind et al. | |
| 6,915,427 B2 | 7/2005 | Maruyama et al. | |
| 6,941,459 B1 | 9/2005 | Hind et al. | |
| 6,963,980 B1 | 11/2005 | Mattsson | |
| 6,990,636 B2 | 1/2006 | Beauchamp | |
| 6,990,660 B2 | 1/2006 | Moshir et al. | |
| 7,137,143 B2 | 11/2006 | Chawla et al. | |
| 7,152,244 B2 | 12/2006 | Toomey | |
| 7,266,699 B2 | 9/2007 | Newman et al. | |
| 7,272,229 B2 | 9/2007 | Nakano et al. | |
| 7,325,129 B1 | 1/2008 | Mattsson et al. | |
| 7,421,081 B2* | 9/2008 | Zhang et al. | 380/277 |
| 7,477,748 B2* | 1/2009 | Schmidt | 380/279 |
| 7,644,445 B2* | 1/2010 | Zhu et al. | 726/30 |
| 2002/0012473 A1 | 1/2002 | Kondo et al. | |
| 2002/0015497 A1 | 2/2002 | Maruyama et al. | |
| 2002/0016911 A1 | 2/2002 | Chawla et al. | |
| 2002/0039420 A1 | 4/2002 | Shacham et al. | |
| 2002/0066038 A1 | 5/2002 | Mattsson et al. | |
| 2002/0073232 A1 | 6/2002 | Hong et al. | |
| 2002/0087884 A1 | 7/2002 | Shacham et al. | |
| 2002/0100036 A1 | 7/2002 | Moshir et al. | |
| 2002/0112167 A1 | 8/2002 | Boneh et al. | |
| 2002/0126850 A1* | 9/2002 | Allen et al. | 380/277 |
| 2003/0014650 A1 | 1/2003 | Freed et al. | |
| 2003/0039362 A1 | 2/2003 | Califano et al. | |
| 2003/0046572 A1 | 3/2003 | Newman et al. | |
| 2003/0059054 A1* | 3/2003 | Hu et al. | 380/277 |
| 2003/0065919 A1 | 4/2003 | Albert et al. | |
| 2003/0097428 A1 | 5/2003 | Afkhami | |
| 2003/0101355 A1 | 5/2003 | Mattsson | |
| 2003/0123671 A1 | 7/2003 | He et al. | |
| 2003/0156719 A1 | 8/2003 | Cronce | |
| 2003/0197733 A1 | 10/2003 | Beauchamp et al. | |
| 2003/0204513 A1 | 10/2003 | Bumbulis | |
| 2004/0015725 A1 | 1/2004 | Boneh et al. | |
| 2004/0255140 A1 | 12/2004 | Margolus et al. | |
| 2005/0004924 A1 | 1/2005 | Baldwin | |
| 2006/0010324 A1* | 1/2006 | Appenzeller et al. | 713/171 |
| 2006/0041533 A1 | 2/2006 | Koyfman | |
| 2006/0149962 A1 | 7/2006 | Fountain et al. | |
| 2007/0074047 A1 | 3/2007 | Metzger et al. | |
| 2007/0079140 A1 | 4/2007 | Metzger et al. | |
| 2007/0079386 A1 | 4/2007 | Metzger et al. | |
| 2007/0250904 A1* | 10/2007 | Waller | 726/1 |
| 2008/0192938 A1* | 8/2008 | Patariu et al. | 380/279 |
| 2009/0217385 A1* | 8/2009 | Teow et al. | 726/27 |

FOREIGN PATENT DOCUMENTS

| | | |
|---|---|---|
| WO | WO 02/101605 A2 | 12/2002 |

OTHER PUBLICATIONS

U.S. Appl. No. 10/850,827, Koyfman, filed May 20, 2004.
U.S. Appl. No. 11/236,046, Metzger et al., filed Sep. 26, 2005.
U.S. Appl. No. 11/236,294, Metzger et al., filed Sep. 26, 2005.
U.S. Appl. No. 11/236,061, Metzger et al., filed Sep. 26, 2005.
U.S. Appl. No. 11/341,060, Metzger et al., filed Jan. 27, 2006.
Alteon Web Systems: "The Next Step in Server Loading Balancing" Nov. 1999, Retrieved from the Internet: URL:http:/www.nortelnetworks.com/products/library/collateral/intel_int/webworking_wp.pdf, Retrieved on Mar. 2, 2004; pp. 1-15.
Alteon Web Systems: "Networking with the Web in Mind" May 1999, Retrieved from the Internet: URL:http://www.nortelnetworks.com/products/library/collateral/intel_int/webworking_wp.pdf, Retrieved on Mar. 2, 2004; p. 1, pp. 1-11.
Boneh, D., "Twenty Years of Attacks on the RSA Cyrptosystem," Notices of the AMS, vol. 46, No. 2, pp. 203-213, 1999.
Boneh, et al., "An Attack on RSA Given a Small Fraction of the Private Key Bits," ASIACRYPT '98, LNCS 1514, pp. 25-34, 1998.
Boneh, et al., "Cryptanalysis of RSA with Private Key d Less than $N^0.292$," (extended abstract), 1999.
Durfee, G., et al., "Cryptanalysis of the RSA Schemes with Short Secret Exponent from Asiacrypt '99," ASIACRYPT 2000, LNCS 1976, pp. 14-29, 2000.
Fiat, A. "Batch RSA, (digital signatures and public key krypto-systems)" Advances in Crytology—Cryto '89 Proceedings Aug. 20-24, 1989, Springer-Verlag.
Großschädl, J., et al., "The Chinese Remainder Theorem and its Application in a High-Speed RSA Crypto Chip," 2000.
Herda, S., "Non-repudiation: Constituting evidence and proof in digital cooperation," Computer Standards and Interfaces, Elsevier Sequoia, Lausanne, CH, 17:1 (69-79) 1995.
Immerman, N., "Homework 4 with Extensive Hints," 2000.
Menezes, A., et al., "Handbook of Applied Cryptography," 1996 CRC Press, pp. §8.2-§8.3 and §14.5.
Netscape; "Netscape Proxy Server Administrator's Guide, Version 3.5 for Unix"; Feb. 25, 1998; Retrieved from the Internet.
Oppliger, R.; "Authorization Methods for E-Commerce Applications"; 1999.
RSA Laboratories: "PKCS #7: Cryptographic Message Syntax Standard, Version 1.5," RSA Laboratories Technical Note, pp. 1-30, Nov. 1, 1993.
RSA "PKCS #1 v2.0 Amendment 1: Multi-Prime RSA," 2000.
"Security Protocols Overview (An RSA Data Security Brief)", RSA Data Security, 1999, http://www.comms.scitech.susx.ac.uk/fft/crypto/security_protocols.pdf, pp. 1-4.
Schacham, H., et al., "Improving SSL Handsake Performance via Batching," Topics in Cryptology, pp. 28-43, 2001.
Shand, M., et al., "Fast Implementations of RSA Cryptography," (1993).
Sherif, M.H., et al., "SET and SSL: Electronic Payments on the Internet," IEEE, pp. 353-358 (1998).
Stallings, W., "IP Security," Network Security Essentials, Applications and Standards, Chapters 6 and 7, pp. 162-223 (2000).
Takagi, T., "Fast RSA-Type Cryptosystem Modulo $p^kq$," pp. 318-326, (1998).
Takagi, T., "Fast RSA-Type Cryptosystems Using N-Adic Expansion," Advances in Technology—CRYPTO '97, LNCS 1294, pp. 372-384, 1997.
Wiener, M., "Cryptanalysis of Short RSA Secret Exponents," (1989).

* cited by examiner

MULTIKEY SUPPORT FOR MULTIPLE OFFICE SYSTEM

CROSS-REFERENCE TO RELATED APPLICATIONS

This application claims the benefit of U.S. Patent Application No. 60/854,977 filed Oct. 27, 2007, which is incorporated by reference.

BACKGROUND

As data security requirements extend from a data center to retail locations and branch offices, the problem of key management is exacerbated. Data entering an enterprise IT infrastructure at a Remote Office/Branch Office (ROBO) should probably be encrypted prior to short or long term storage. The data will need to be decrypted for use at the ROBO itself, and in many cases, decrypted at central data centers for bulk processing and aggregation applications such as data warehousing. As many large banks and retail operations have stores numbering in the thousands, it may be tempting for them to re-use encryption keys amongst branch locations, perhaps using a single key to encrypt all data at all locations. As store locations are inherently less secure than data center facilities, the risk of key compromise and data theft becomes more likely. The more locations where a single encryption key is stored, the more opportunity there is for physical theft or electronic break in. Compounding the issue is that the more data encrypted with a single key, the more valuable compromising that key becomes to would-be identity thieves.

Since it is rare that individual stores and branch offices need to share data with each other, there is typically no requirement that they share encryption keys. Indeed the ideal solution from a security standpoint is to have all data of similar form at each branch encrypted with a key unique to that location. With dozens of fields that may need encryption and potentially thousands of branches, the best practices security solution creates a key management nightmare for medium and large enterprises. Tens of thousands of keys must be kept in a database at the data center and selectively and securely distributed to the correct branch offices. This difficulty of modifying a key property or policy is now multiplied, and the probability of error is high. Adding new keys for new applications and rotating keys likewise quickly become intractable problems.

These and other issues are addressed, resolved, and/or ameliorated using techniques described herein.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

Though the notion of using distinct keys for different applications and locations to minimize risk is not new, techniques provided herein allow best practice security to be as easy to administer as less secure options. This solution improves on simpler encryption schemes by reducing the exposure of a key compromise at remote locations, while adding minimal administrator overhead.

These and other advantages of the present invention will become apparent to those skilled in the art upon a reading of the following descriptions and a study of the several figures of the drawings.

BRIEF DESCRIPTION OF THE DRAWINGS

Embodiments of the present invention are illustrated in the figures. However, the embodiments and figures are illustrative rather than limiting; they provide examples of the invention.

The foregoing examples of the related art and limitations related therewith are intended to be illustrative and not exclusive. Other limitations of the related art will become apparent to those of skill in the art upon a reading of the specification and a study of the drawings.

DETAILED DESCRIPTION

In the following description, for the purposes of explanation, numerous specific details are set forth in order to provide a thorough understanding of the present invention. It will be apparent, however, to one skilled in the art that the present invention may be practiced without one or more of these specific details or in combination with other components or process steps. In other instances, well-known structures and devices are shown in block diagram form in order to avoid unnecessarily obscuring the present invention.

Figure 1:
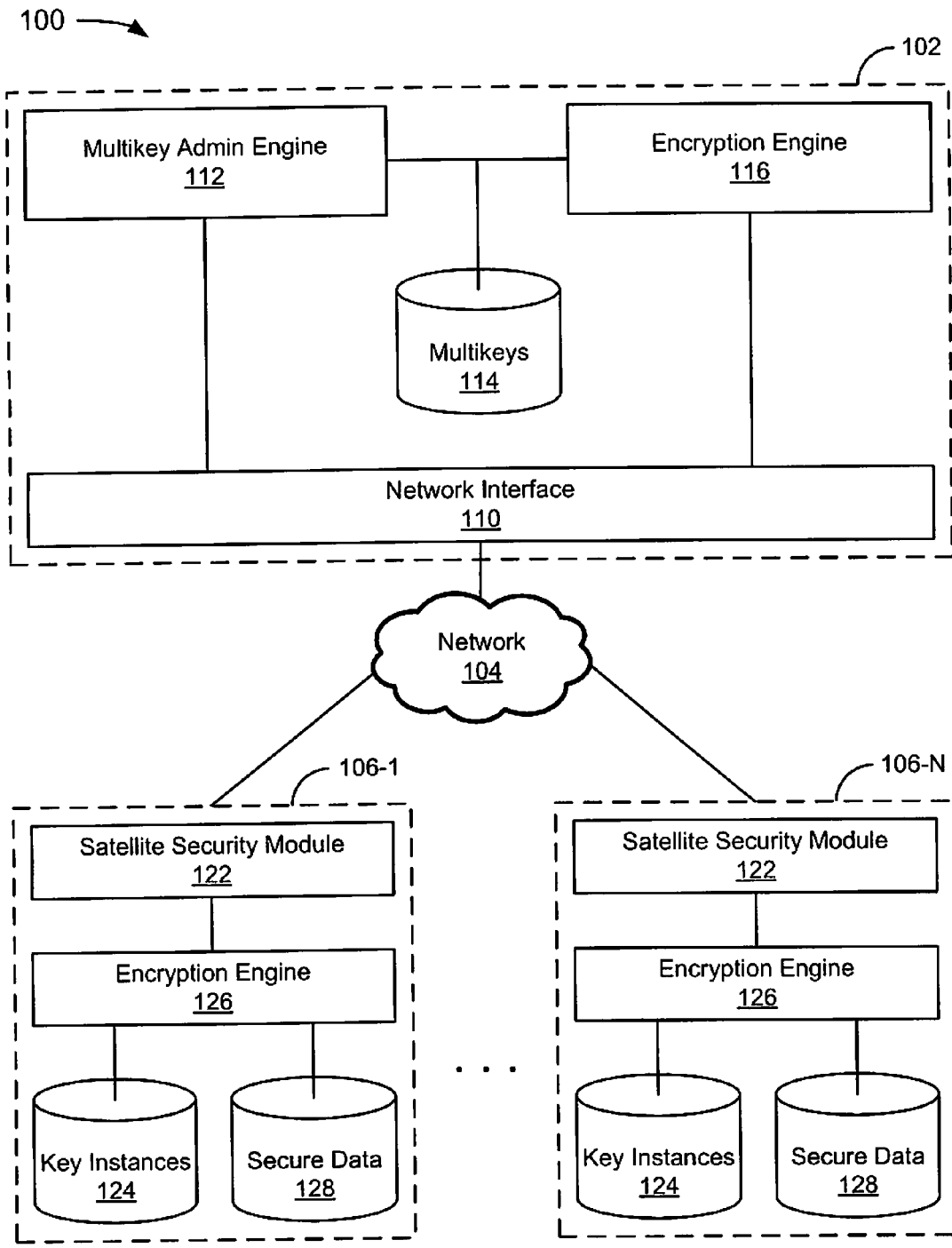
FIG. 1 depicts an example of a system for centralized administration of a multikey for a plurality of clients.

FIG. 1 depicts an example of a system 100 for centralized administration of a multikey for a plurality of clients. The system 100 includes a central security platform 102, a network 104, and a plurality of satellite security platforms (devices or software agents) 106-1 to 106-N (referred to collectively as the satellite security platforms 106). The central security platform 102 includes a network interface 110, a multikey admin engine 112, a multikey database 114, and an encryption engine 116. The satellite security platforms 106 each include a satellite security module 122, a key instances database 124, an encryption engine 126, and a secure database 128.

In the example of FIG. 1, the central security platform 102 may include any of a variety of known or convenient components associated with a computer, including by way of example but not limitation, a processor, an input device, an output device, etc. The central security platform 102 may include a security appliance, such as, by way of example but not limitation, a DataSecure® appliance produced by Ingrian Networks, Inc., that has been augmented to support the notion of a multikey. A security appliance, for the purposes of this description is a known or convenient device that provides security across computer networks.

In a non-limiting embodiment, the central security platform 102 may include a module used to integrate security services, such as, by way of example but not limitation, verification and management. For illustrative simplicity, such security services are presumed to be part of the multikey admin engine 112.

In a non-limiting embodiment, the central security platform 102 provides cryptographic data security functions. For example, encryption software on the central security platform 102 may enable transmission of digital information such as, by way of example but not limitation, confidential, financial, and credit card information. By using cryptographic data security functions, the central security platform 102 can be referred to as being securely coupled to the satellite security platforms 106, which are also enabled for secure communications. In this way, the central security platform 102 is able to securely communicate with software running at each of the satellite security platforms 106.

In the example of FIG. 1, the network interface 110 couples the multikey admin engine 112 and the encryption engine 116 to the network 104. The network interface 110 facilitates transmission of multikey instances to the satellite security platforms 106.

The multikey database 114 is coupled to both the multikey admin engine 112 and the encryption engine 116. In operation, an administrative agent (e.g., a human or software agent) uses the multikey admin engine 112 to perform tasks associated with a multikey. For example, the multikey admin engine 112 can be used to modify properties, permissions, or policies associated with a multikey. Advantageously, the modifications to the multikey affect the instances of the multikey that are used at one or more of the satellite security platforms 106. In an embodiment, the administrative agent can also modify instances of a multikey, as described later.

In the example of FIG. 1, the multikey database 114 may include multikeys of any known or convenient type, including by way of example but not limitation, AES, 3DES, RC4, RSA, HMac, or some other known or convenient type. To the administrative agent, the multikey appears and is managed as a single encryption key, with one set of properties, permissions, and policies. However, for each one of the satellite security platforms 106, a unique encryption key associated with the multikey will be created automatically on the central security device 102 and transferred to the appropriate one of the satellite security devices 106. The unique encryption key is called an instance of the multikey. Each multikey instance has a unique identifier associated with it so that the encryption engine 116 can be used to decrypt any data transferred from a remote location using that location's instance.

Each multikey is associated with a specific secure item or set of secure items. Each instance of a particular multikey is associated with one of the satellite security platforms 106. Presumably, at least one of the secure items will be the same at a plurality of the satellite security platforms 106, since that is one of the advantages of implementing the techniques described herein. For example, it may be determined that a credit card field in a database is a secure item. In this example, each of the satellite security platforms 106 may, therefore, use an instance of the credit card multikey to encrypt/decrypt the field. The secure item may be anything that is protectable via a key (i.e., anything that can be stored in memory). If a multikey instance is regenerated, the satellite security platform associated with the regenerated multikey instance may or may not retain an old instance for the purpose of decrypting secure items, and re-encrypting with the regenerated multikey instance.

Not all of the satellite security platforms 106 necessarily have the same security items. For example, a first of the satellite security platforms 106 may be associated with a program that makes use of one or more multikeys, while a second of the satellite security platforms 106 may not be associated with the program. In this case, the first of the satellite security platforms 106 may have one or more instances of respective one or more multikeys, while the second of the satellite security platforms 106 has none of these instances.

Advantageously, when a multikey property, permission or policy is modified with the multikey admin engine 112, it may be done only once and replicated to all relevant satellite security platforms 106. Thus, the multikey administrative engine facilitates management of the first multikey as a single key. The policy associated with a multikey is assumed to be part of the multikey database, since the term database is used broadly to include any known or convenient means for storing data, whether centralized or distributed, relational or otherwise. When a new key is added to the multikey database 114 for a new application or field requiring encryption, the instances are automatically generated when the key is pushed to the relevant satellite security platforms 106. It may be noted that "relevant" satellite security platforms 106 may be those platforms that use an application or field associated with the multikey.

Should a particular multikey instance be compromised, the instance can be regenerated individually at the central security platform 102 in such a way that both the old and new key instances are present for the purposes of decrypting data using the compromised key and encrypting it with the new key at the satellite security platform where the instance was deemed to be compromised. When all satellite security platforms 106 need a key rotation, for example due to a corporate key-lifetime policy, the administrative agent can generate a new multikey and rotate all branches simultaneously. Administration is further simplified by being able to backup and restore all multikey instances as if they were a single key.

In a non-limiting embodiment, the central security platform 102 can further be used as a failover satellite server if one of the satellite security platforms 106 becomes unavailable. Although this is optional, it is relatively easy to implement in most cases, as would be understood by one of skill in the relevant arts.

In the example of FIG. 1, the network 104 may include any type of network including but not limited to the Internet, an intranet, a LAN, a WAN, a WLAN, a VLAN, or any other known or convenient network that is capable of carrying electronic data. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known, and known or convenient protocols and communication procedures could be used.

In the example of FIG. 1, the satellite security platforms 106 may include any of a variety of known or convenient components associated with a computer, including by way of example but not limitation, a processor, an input device, an output device, etc. One or more of the satellite security platforms 106 may include a security appliance, such as, by way of example but not limitation, an EdgeSecure™ appliance produced by Ingrian Networks, Inc. or a Network Attached Encryption™ device produced by Ingrian Networks, Inc. A security appliance, for the purposes of this description is a known or convenient device that provides security across computer networks.

In a non-limiting embodiment, the satellite security platforms 106 may include computer hardware and cryptography software for off-loading security functions from one or more application servers onto the central security platform 102. Such hardware and software is conceptually represented, without distinguishing between hardware and software, in the satellite security module 122. However, off-loading security functions is optional, and could be performed locally. In addition, the satellite security platforms 106 may also include a software agent for accepting/using multikeys from the central security platform 102.

In a non-limiting embodiment, the satellite security platforms 106 are each associated with a remote office/branch office (ROBO). As such, multiple computers could be associated with a single satellite security platform, if the computers are all part of the same ROBO. The actual location of associated computers is only tangentially related to the ROBO because of the possibility of distributed computing for a single ROBO. Each ROBO may have multiple security appliances or devices. For example, a single ROBO may need multiple appliances for, e.g., processing higher transaction volumes. In such a case, all of the devices may use the same unique location identifier, which translates to their use of the same instance of a multikey, as will be described later.

At the satellite security platforms 106, the satellite security module 122 uses the relevant multikey instances in the instances database 124 to encrypt and decrypt data (using the encryption engine 126) in conjunction with access to a secure database 128. The instances are uniquely associated with a particular one of the satellite security platforms 106, which is more secure than when satellite security platforms 106 use identical keys.

When a device or component associated with one of the satellite security platforms 106 requires replacement, a new device or component can use the same identifier (which is, for example, location-based) as the old to ensure previously encrypted data can still be decrypted. In a non-limiting embodiment, the identifier can further be used to ensure that a first of the satellite security platforms 106 is not configured incorrectly by attempting to encrypt with a key that belongs to a second of the satellite security platforms 106.

Figure 2:
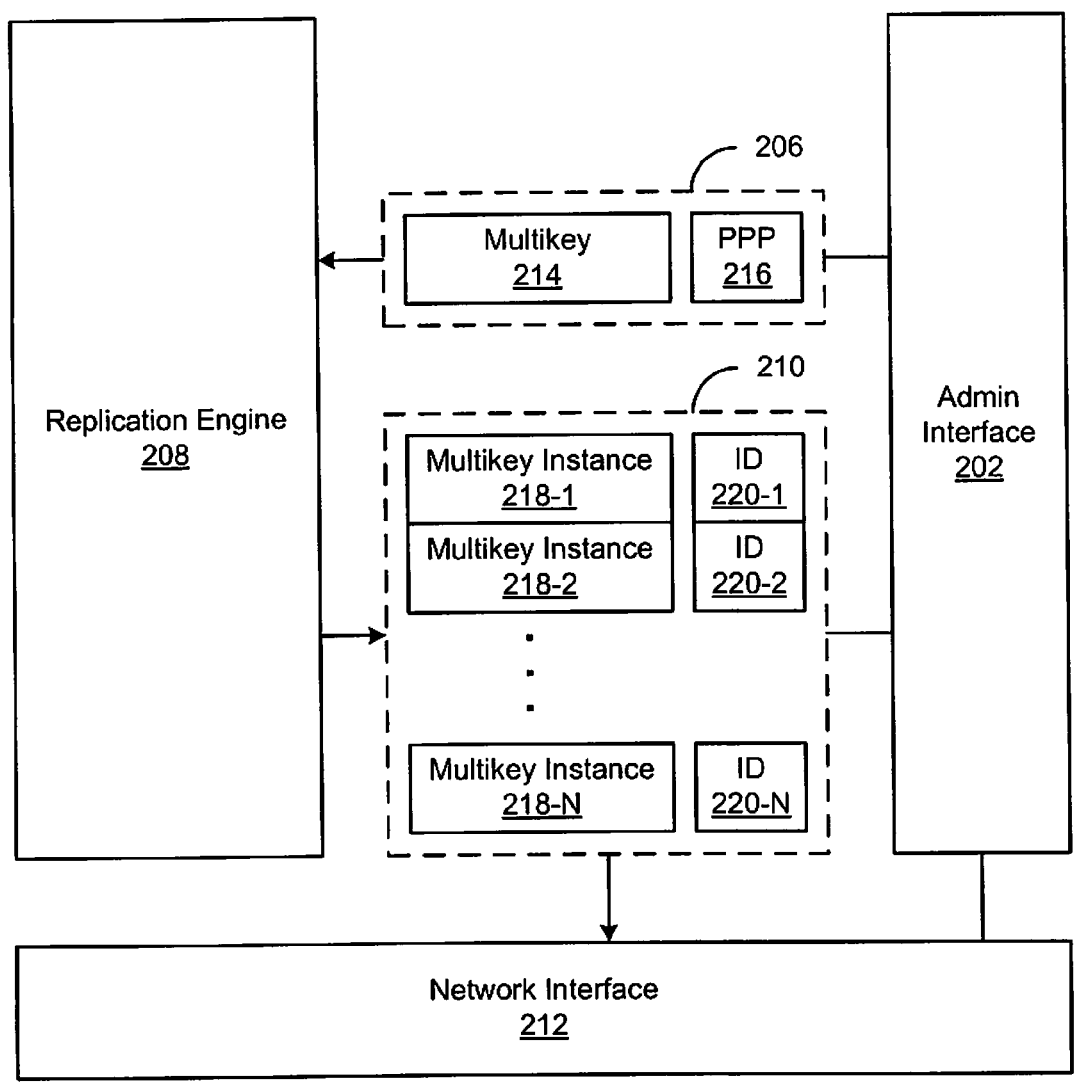
FIG. 2 depicts an example of a system for administration of a multikey.

FIG. 2 depicts an example of a system 200 (multikey administration engine 112 in FIG. 1) for administration of a multikey. In the example of FIG. 2, the system 200 includes an admin interface 202, a multikey record 206, a replication engine 208, multikey instance array 210, and a network interface 212.

In the example of FIG. 2, the admin interface 202 is coupled to the multikey record 206, the multikey instance array 210, and the network interface 212. Through the admin interface 202, an administrative agent can modify the multikey record 206 or, if implemented to allow modification of instances, any of the elements of the multikey instance array 210. Thus, the admin interface facilitates management of the multikey record by an administrative agent, and any changes to the multikey record may, depending upon the implementation and embodiment, automatically be associated with elements of the multikey instance array 210. The administrative agent may access the various components of the system 200 from a remote location (e.g., through the network interface 212) or locally. Advantageously, the multikey record 206 can be used in the same manner as a single key, with a single change affecting each of the elements of the multikey instance array 210 (if desired).

The admin interface 202 can be used to input data that is relevant to a plurality of keys. For example, an administrative agent may input details of a key-lifetime policy. Such a policy typically calls for automatic periodic regeneration of keys.

In the example of FIG. 2, when a new key is desired—by way of example but not limitation, because a new location comes online, or because, e.g., a data field that was protected via an instance of the multikey at a first location is going to be used as a second location, a portion of the multikey record 206 can be pushed to the replication engine 208. The replication engine 208, in response to the command, replicates a new instance of the multikey.

In the example of FIG. 2, the multikey record 206 includes a multikey 214 and properties, permissions, policies (PPP) 216. Although only the multikey 214, and its associated PPP 216 is shown, the multikey record 206 could be one of many in a database of multikeys, such as the multikey database 114 in FIG. 1. Each multikey may be associated with a data or program, which can be but is not limited to, a database, one or more database fields, a representation of an entity, a program, an application, one or more procedures associated with a program, or a known or convenient data structure that is to be protected with a key.

The replication engine 208 is capable of properly populating the multikey instance array 210 with new instance(s). The replication engine 208 may use a multikey associated with a multikey record to generate an instance of the multikey. Advantageously, the administrative agent need not enter additional information at this point because the instance(s) are replicated automatically. The replication engine 208 may be configured to generate new instances of multikeys in accordance with a key-lifetime policy. The instances become available to a satellite platform after provisioning to the multikey instance array 210.

In the example of FIG. 2, the multikey instance array 210 includes multikey instances 218-1 to 218-N (referred to collectively as multikey instances 218) and respective identifiers 220-1 to 220-N (referred to collectively as IDs 220). The multikey instance array 210 is assumed, for illustrative purposes, to be associated with the multikey record 206. In an embodiment that includes multiple multikeys, the system would presumably also include multiple multikey arrays 210. Although the multikey instances 218 are associated with the PPP 216, it should be noted that in an embodiment, and administrative agent may be given the ability to modify PPP with respect to specific instances. Thus, changes to the PPP 216 would automatically be associated with the multikey instances 218, but one or more of the multikey instances could be directly accessed and edited. This would mean that the multikey instance array 210 could be modified to include additional data for one or more of the multikey instances 218.

In a non-limiting embodiment, a first of the multikey instances 218 is available to a first satellite platform through the network interface 212 (in alternative embodiments, the first instance may be available through some other known or convenient means). The first instance may be sent according to any means known or convenient, such as by push, pull, or some other transmission means. There are many reasons why new keys might be generated for provisioning to a satellite platform. By way of example but not limitation, a new key may be desired when a new satellite comes online, when it is time to cycle through keys in accordance with a key-lifetime policy, when a key at a satellite platform may have been compromised.

In a non-limiting embodiment, the network interface 212 may receive notification of a potentially compromised instance of the multikey at a satellite platform associated with the instance of the multikey. When receiving notification of this kind the network interface 212 may forward the notification to the admin interface 202 to notify an administrative agent. Alternatively the network interface 212 could, in response to the notification, order the replication engine 208 to automatically generate a new instance of the multikey to replace the potentially compromised instance. This may be due to a preset option by an administrative agent, or may be due to an implementation decision.

It may be desirable to maintain an old instance of a key for a period of time. For example, if a key was possibly compromised, it may be desirable to have the replication engine 208 generate a new instance of a multikey, which is provided to the satellite platform. However, data associated with the satellite platform is encrypted using the compromised key. So the satellite platform should maintain a copy of the compromised key long enough that the relevant data can be decrypted with the old key, and encrypted with the new multikey instance. When the data has been successfully encrypted with the new multikey instance, the old key can be discarded or stored as desired.

Figure 3:
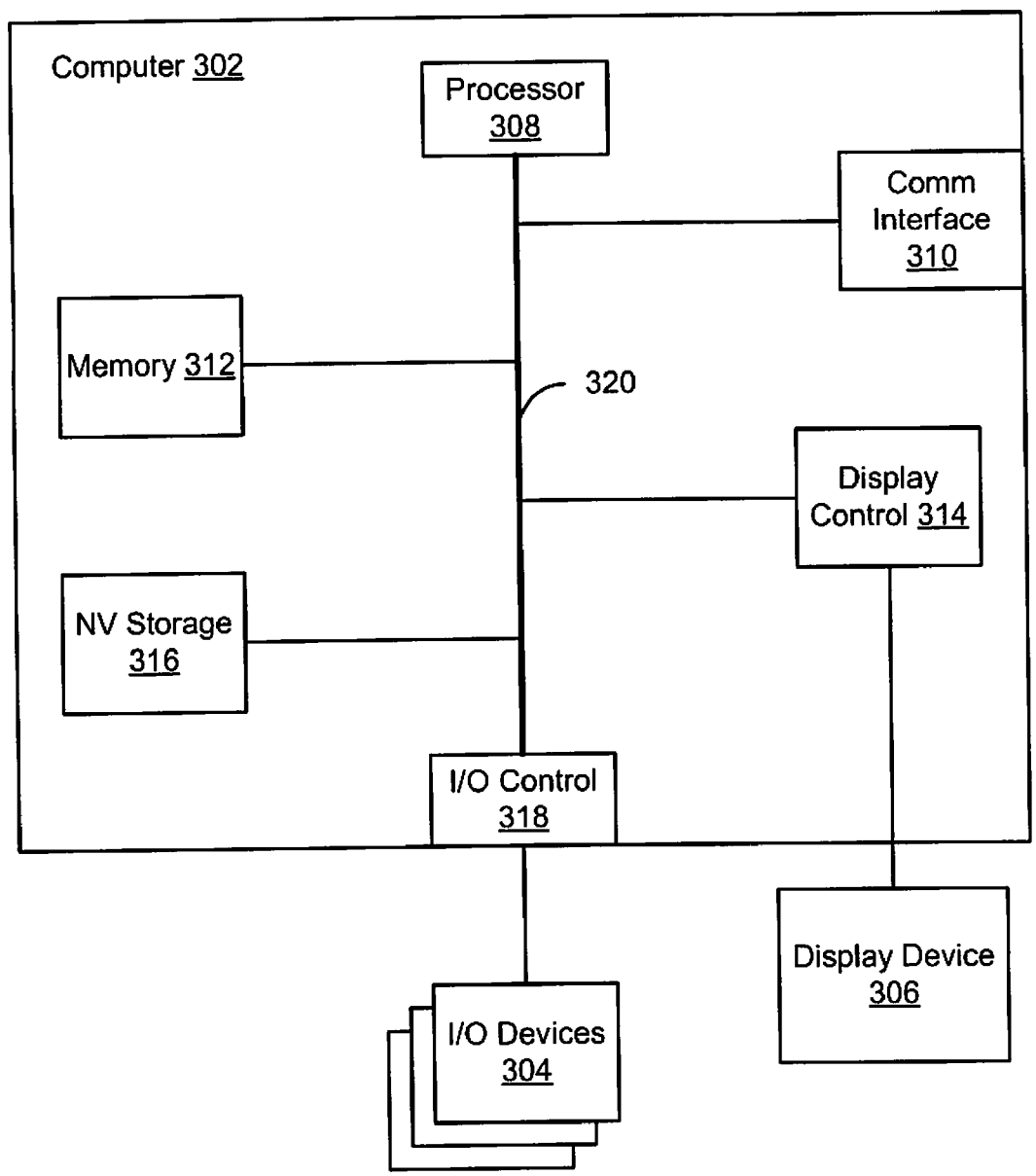
FIG. 3 depicts a computer system for use in the systems of FIGS. 1 and 2.

FIG. 3 depicts a computer system 300 for use in the system 100 (FIG. 1) and/or system 200 (FIG. 2). The computer system 300 includes a computer 302, I/O devices 304, and a display device 306. The computer 302 includes a processor 308, a communications interface 310, memory 312, display controller 314, non-volatile storage 316, and I/O controller 318. The computer 302 may be coupled to or include the I/O devices 304 and display device 306.

The computer 302 interfaces to external systems through the communications interface 310, which may include a modem or network interface. The communications interface 310 can be considered to be part of the computer system 300 or a part of the computer 302. The communications interface 310 can be an analog modem, ISDN modem, cable modem, token ring interface, satellite transmission interface (e.g. "direct PC"), or other interfaces for coupling a computer system to other computer systems. Although conventional computers typically include a communications interface of some type, it is possible to create a computer that does not include one, thereby making the communications interface 310 optional in the strictest sense of the word.

The processor 308 may include, by way of example but not limitation, a conventional microprocessor such as an Intel Pentium microprocessor or Motorola power PC microprocessor. While the processor 308 is a critical component of all conventional computers, any applicable known or convenient processor could be used for the purposes of implementing the techniques described herein. The memory 312 is coupled to the processor 308 by a bus 320. The memory 312, which may be referred to as "primary memory," can include Dynamic Random Access Memory (DRAM) and can also include Static RAM (SRAM). The bus 220 couples the processor 308 to the memory 312, and also to the non-volatile storage 316, to the display controller 314, and to the I/O controller 318.

The I/O devices 304 can include a keyboard, disk drives, printers, a scanner, and other input and output devices, including a mouse or other pointing device. For illustrative purposes, at least one of the I/O devices is assumed to be a block-based media device, such as a DVD player. The display controller 314 may control, in a known or convenient manner, a display on the display device 306, which can be, for example, a cathode ray tube (CRT) or liquid crystal display (LCD).

The display controller 314 and I/O controller 318 may include device drivers. A device driver is a specific type of computer software developed to allow interaction with hardware devices. Typically this constitutes an interface for communicating with the device, through a bus or communications subsystem that the hardware is connected to, providing commands to and/or receiving data from the device, and on the other end, the requisite interfaces to the OS and software applications.

The device driver may include a hardware-dependent computer program that is also OS-specific. The computer program enables another program, typically an OS or applications software package or computer program running under the OS kernel, to interact transparently with a hardware device, and usually provides the requisite interrupt handling necessary for any necessary asynchronous time-dependent hardware interfacing needs.

The non-volatile storage 316, which may be referred to as "secondary memory," is often a magnetic hard disk, an optical disk, or another form of storage for large amounts of data. Some of this data is often written, by a direct memory access process, into memory 312 during execution of software in the computer 302. The non-volatile storage 316 may include a block-based media device. The terms "machine-readable medium" or "computer-readable medium" include any known or convenient storage device that is accessible by the processor 308 and also encompasses a carrier wave that encodes a data signal.

The computer system 300 is one example of many possible computer systems which have different architectures. For example, personal computers based on an Intel microprocessor often have multiple buses, one of which can be an I/O bus for the peripherals and one that directly connects the processor 308 and the memory 312 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 312 for execution by the processor 308. A Web TV system, which is known in the art, is also considered to be a computer system, but it may lack some of the features shown in FIG. 3, such as certain input or output devices. A typical computer system will usually include at least a processor, memory, and a bus coupling the memory to the processor.

The computer system 300 may be controlled by an operating system (OS). An OS is a software program—used on most, but not all, computer systems—that manages the hardware and software resources of a computer. Typically, the OS performs basic tasks such as controlling and allocating memory, prioritizing system requests, controlling input and output devices, facilitating networking, and managing files. Examples of operating systems for personal computers include Microsoft Windows®, Linux, and Mac OS®. Delineating between the OS and application software is sometimes rather difficult. Fortunately, delineation is not necessary to understand the techniques described herein, since any reasonable delineation should suffice.

The lowest level of an OS may be its kernel. The kernel is typically the first layer of software loaded into memory when a system boots or starts up. The kernel provides access to various common core services to other system and application programs.

As used herein, algorithmic descriptions and symbolic representations of operations on data bits within a computer memory are believed to most effectively convey the techniques to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer that manipulates and transforms data represented as physical (electronic) quantities within the computer system's registers and memories into other data similarly represented as physical quantities within the computer system memories or registers or other such information storage, transmission or display devices.

An apparatus for performing techniques described herein may be specially constructed for the required purposes, or it may comprise a general purpose computer selectively activated or reconfigured by a computer program stored in the computer. Such a computer program may be stored in a computer readable storage medium, such as, by way of example but not limitation, read-only memories (ROMs), RAMs, EPROMs, EEPROMs, magnetic or optical cards, any type of disk including floppy disks, optical disks, CD-ROMs, DVDs, and magnetic-optical disks, or any known or convenient type of media suitable for storing electronic instructions.

The algorithms and displays presented herein are not inherently related to any particular computer architecture. The techniques may be implemented using any known or convenient programming language, whether high level (e.g., C/C++) or low level (e.g., assembly language), and whether interpreted (e.g., Perl), compiled (e.g., C/C++), or Just-In-Time (JIT) compiled from bytecode (e.g., Java). Any known or convenient computer, regardless of architecture, should be capable of executing machine code compiled or otherwise assembled from any language into machine code that is compatible with the computer's architecture.

Figure 4:
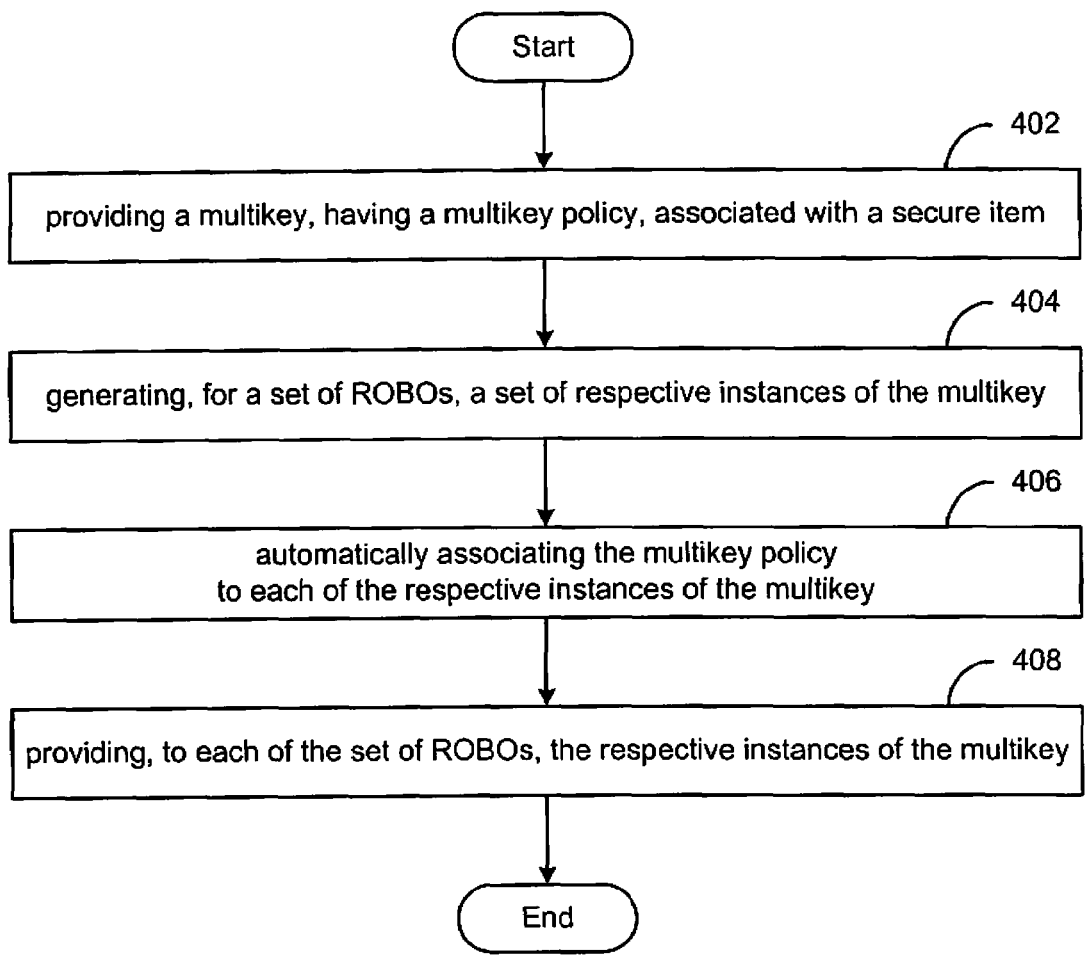
FIG. 4 depicts a flowchart of an example of a method for multikey instantiation.

FIG. 4 depicts a flowchart 400 of an example of a method for multikey instantiation. In the example of FIG. 4, the flowchart 400 starts at module 402 with providing a multikey, having a multikey policy, associated with a secure item. The flowchart 400 continues to module 404 with generating, for a set of remote office/branch offices (ROBOs), a set of respective instances of the multikey. The flowchart 400 continues to module 406 with automatically associating the multikey policy to each of the respective instances of the multikey. The flowchart 400 ends at module 408 with providing, to each of the set of ROBOs, the respective instances of the multikey.

As used herein, the term "policy" is broadly construed to include any data associated with a multikey including, but not limited to, policies, permissions, and protocols (PPP).

As used herein, an engine is a software, firmware, and/or hardware construct that carries out a particular function or functions. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system comprising:
   a central security platform, including a database of multikey records, including a first multikey having one or more associated policies;
   a plurality of satellite security platforms, coupled to the central security platform, at least one of the plurality of satellite security platforms including:
   a secure item;
   a respective instance of the first multikey, said instance being derived from said first multikey and inheriting at least one policy of said first multikey; and
   an encryption engine, wherein, in operation, the encryption engine uses the respective instance of the first multikey to encrypt or decrypt the secure item;
   wherein the central security platform further includes a multikey administrative engine, and wherein, in operation, changes made to the one or more associated policies by the multikey administrative engine automatically result in identical changes to policies associated with the respective instance of the first multikey at each of the plurality of satellite platforms.

2. The system of claim 1, wherein the central security platform further includes a multikey administrative engine, and wherein, in operation, the multikey administrative engine facilitates management of the first multikey as a single key.

3. The system of claim 1, further comprising a network interface through which the respective instance of the first multikey is sent to each of the satellite security platforms.

4. The system of claim 1, wherein a satellite security platform of the plurality of satellite security platforms includes a satellite security module, wherein the respective instance of the first multikey of the satellite security platform is a first instance of the first multikey, and wherein, in operation, the satellite security module:
   receives a second instance of the first multikey, wherein said second instance is derived from said first multikey and inherits at least one policy of said first multikey;
   decrypts the secure item using the first instance of the first multikey;
   encrypts the secure item using the second instance of the first multikey.

5. The system of claim 1, wherein the secure item is a first secure item, and wherein:
   the database of multikey records further includes a second multikey;
   a subplurality of satellite security platforms further include:
   a second secure item;
   a respective instance of the second multikey, wherein said second instance is derived from said second multikey and inherits at least one policy of said second multikey;

wherein, in operation, the encryption engine uses the respective instance of the second multikey to encrypt or decrypt the second secure item.

6. A system comprising:
a first database, including a multikey record, coupled to the administrative interface;
a replication engine coupled to the first database;
a multikey instance array, coupled to the replication engine;
an interface coupled to the second database;
wherein, in operation, the replication engine:
uses a multikey associated with the multikey record and having one or more policies associated with said multikey and information associated with a remote location to derive from the multikey an instance of the multikey, wherein the instance of the multikey is associated with the remote location;
adds the instance of the multikey to the multikey instance array; and
associates at least one of said one or more policies with said instance of the multikey;
wherein, in operation, the interface transmits the instance of the multikey to the associated remote location;
wherein the system further includes a multikey administrative engine, and wherein, in operation, changes made to the one or more associated policies automatically result in identical changes to policies associated with the respective instance of the multikey at each remote location.

7. The system of claim 6, further comprising an administrative interface, wherein, in operation, the administrative interface facilitates management of the multikey record by an administrative agent, and wherein any changes to the multikey record are automatically associated with elements of the multikey instance array.

8. The system of claim 6, wherein the interface is a network interface, further comprising an administrative interface, wherein, in operation, the network interface:
receives notification of a potential compromised instance of the multikey at the remote location associated with the instance of the multikey;
forwards the notification to the administrative interface to notify an administrative agent.

9. The system of claim 6, wherein the multikey record is associated with a key-lifetime policy, and wherein the replication engine generates new instances of the multikey in accordance with the key-lifetime policy.

10. The system of claim 6, wherein, in operation, the interface receives notification of a potential compromised instance at the remote location associated with the instance, and, in response to the notification, the replication engine generates a new instance of the multikey to replace the potentially compromised instance, and the interface transmits the new instance to the remote location.

11. The system of claim 6 wherein the multikey record is a first multikey record, and the multikey instance array is a first multikey instance array, wherein:
the first database further includes a second multikey record;
the second database further includes a second multikey instance array, wherein, in operation, the replication engine:
uses a second multikey associated with the second multikey record and information associated with a remote location to generate an instance of the second multikey, wherein the instance of the second multikey is associated with the remote location;
adds the instance of the second multikey to the second multikey instance array;
wherein the first multikey instance array and the second multikey instance array have different lengths.

12. A method comprising:
providing at a central security platform a multikey, having a multikey policy, associated with a secure item;
generating, by deriving from said multikey, for a set of remote satellite security platforms of office/branch offices (ROBOs), a set of respective instances of the multikey;
automatically associating the multikey policy to each of the respective instances of the multikey at the central security platform;
providing, to each of the set of ROBOs, the respective instances of the multikey; and
wherein changes made to the multikey policy at the central security platform automatically result in identical changes to a policy associated with the respective instance of the multikey at each of the set of remote satellite security platforms.

13. The method of claim 12, further comprising managing the respective set of instances of the multikey as a single key.

14. The method of claim 12, further comprising regenerating the set of respective instances of the multikey in accordance with a key time cycle.

15. The method of claim 12, further comprising:
generating, by deriving from said multikey, an instance of the multikey for a ROBO of the set of ROBOs;
automatically associating the multikey policy to the instance of the multikey;
providing the instance of the multikey to the ROBO.

16. The method of claim 12, further comprising:
generating, by deriving from said multikey, a new instance of the multikey for a new ROBO;
automatically associating the multikey policy to the new instance of the multikey;
providing the new instance of the multikey to the new ROBO.

17. The method of claim 12, further comprising:
receiving a request to reinstantiate a first instance of the set of respective instances of the multikey;
generating, by deriving from said multikey, a second instance to replace the first instance;
automatically associating the multikey policy to the second instance;
providing the second instance to one of the set of ROBOs.

18. The method of claim 17, further comprising, at the one of the set of ROBOS:
using the first instance of the set of respective instances to decrypt a security item;
using the second instance to encrypt the security item.

19. A system, comprising:
a central security platform, comprising:
a multikey database wherein, in operation, stores and manages a multikey with one set of properties, permissions, and policies as a single encryption key, wherein the multikey is associated with a specific secure item;
a multikey administration engine wherein, in operation:
creates and/or replicates an unique instance of the multikey automatically for each of a plurality of satellite security platforms having a data or program containing the specific secure item, each said unique instance being derived from said multikey using information associated with the respective said satellite security platform, wherein said one set of properties, permissions, and policies are associated with said plurality of unique instances of said multikey;

provides the multikey instances unique to each of the plurality of satellite security platforms over a network;

said plurality of satellite security platforms, comprising:
an satellite security module wherein, in operation, encrypts or decrypts the specific secure item in the data or program using the multikey instance via an encryption engine;

wherein, in operation, changes made to said one set of policies by the multikey administrative engine automatically result in identical changes to policies associated with the respective instance of the multikey at each of the plurality of satellite security platforms.

20. A method, comprising:
providing at a central security platform a multikey, having a set of properties, permissions, and policies, associated with a secure item;

generating, by deriving from said multikey, for a set of satellite security platforms at remote office/branch offices (ROBOs) having the secure item, a set of respective instances of the multikey;

associating the multikey policy to each of the respective instances of the multikey automatically;

providing, to each of the set of ROBOs, the respective instances of the multikey; and making changes to the multikey policy, wherein changes made to the multikey policy at the central security platform automatically result in identical changes to policies associated with the respective instances of the multikey at each of the set of ROBOs.

21. The method of claim 20, further comprising:
encrypting or decrypting the secure item at a ROBO using the respective multikey instance unique to the ROBO;

enabling access or modification of the set of properties, permissions, and policies of the multikey with respect to the multikey instance unique to the ROBO;

associating changes to the set of properties, permissions, and policies of the multikey automatically with respect to the set of multikey instances.

22. The method of claim 20, further comprising:
accepting a notification of a potentially compromised instance of the multikey at a ROBO;

generating, by deriving from the multikey, a new instance of the multikey to replace the potentially compromised instance of the multikey at the ROBO;

maintaining both the new instance of the multikey and the potentially compromised instance of the multikey for a period of time at the ROBO;

generating a new multikey and generating, by deriving from the multikey, a new set of multikey instances for key rotation at the set of ROBOs.

23. The method of claim 20, further comprising:
assigning an unique location identifier to each of the set of ROBO;

associating the unique location identifier to the instance of the multikey at the ROBO;

using the same unique location identifier for a new device or component added to the ROBO.

24. A system comprising:
a central security platform that, in operation, defines, disseminates, and enforces one or more policies associated with a multikey for a database over a plurality of distributed satellite security platforms;

said plurality of satellite security platforms, coupled to the central security platform, at least one of the plurality of satellite security platforms, including:
a secure item;
a respective instance derived from the multikey;
an encryption engine, wherein, in operation, the encryption engine uses the respective instance of the multikey to encrypt or decrypt the secure item based on the one or more associated policies inherited by the respective instance from the multikey;

wherein the central security platform further includes a multikey administrative engine, and wherein, in operation, changes made to the one or more associated policies by the multikey administrative engine automatically result in identical changes to policies associated with the respective instance of the multikey at each of the plurality of satellite security platforms.

25. A method comprising:
defining, disseminating, and enforcing for a centralized security platform one or more policies associated with a multikey for a database;

providing the multikey over a plurality of distributed satellite security platforms, wherein at least one of the plurality of satellite security platforms maintains a secure item;

instantiating an instance derived from the multikey at the at least one of the plurality of distributed satellite security platforms;

associating one or more of said policies with the derived instance;

using the respective instance of the multikey to encrypt or decrypt the secure item based on the one or more associated policies; and making changes to the one or more associated policies at the central security platform, wherein said changes automatically result in identical changes to policies associated with the respective instance of the first multikey at each of the plurality of satellite platforms.

* * * * *